July 7, 1936.　　　　J. I. ATKINSON　　　　2,046,600
HOTHOUSE
Filed March 8, 1935
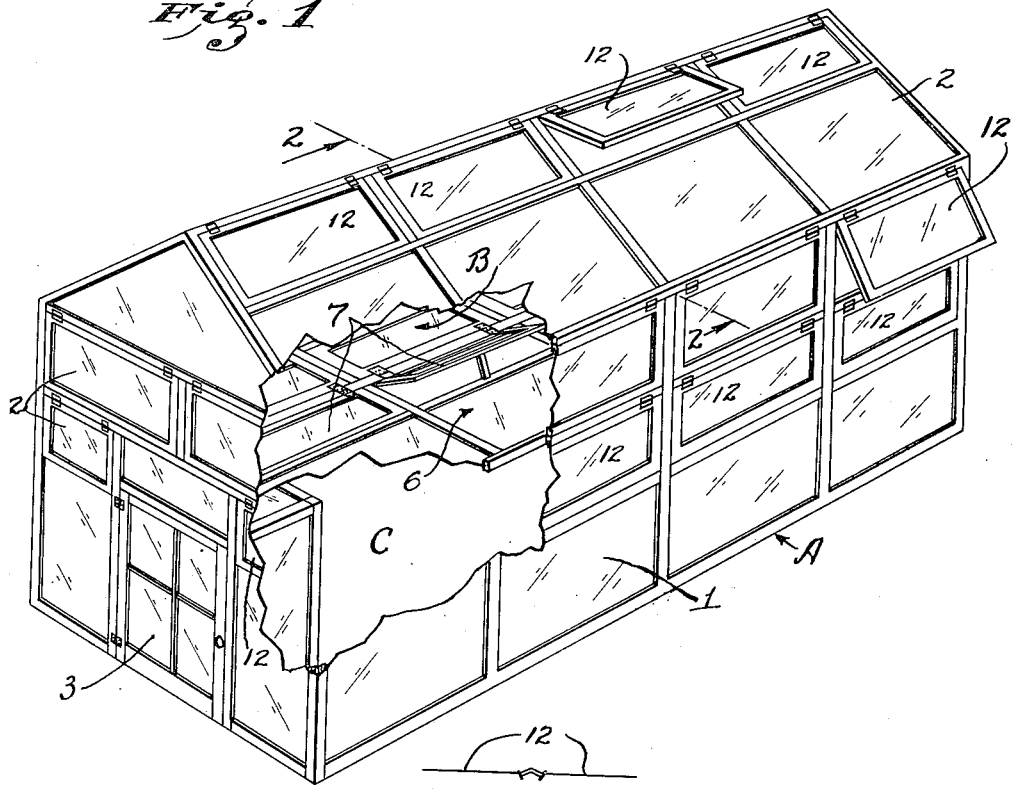
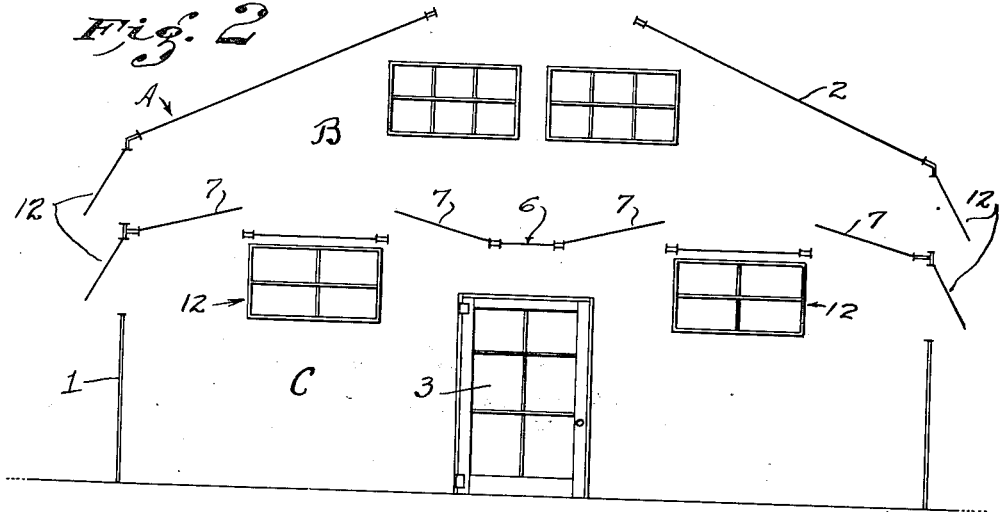
INVENTOR.
John I. Atkinson
BY
Larrabee
his ATTORNEY.

Patented July 7, 1936

2,046,600

UNITED STATES PATENT OFFICE 2,046,600

HOTHOUSE

John I. Atkinson, San Gabriel, Calif.

Application March 8, 1935, Serial No. 10,006

9 Claims. (Cl. 47—17)

My invention relates to a novel method or process, as well as the construction therefor, for the control of atmospheric conditions, such as moisture, temperature, ventilation, and the like in plant propagation houses that are made of glass or other transparent or translucent material so that light and heat from the sun may penetrate to the inside of the house.

An object of my invention is to provide a novel hot house whereby the heat and humidity thereof may be easily and quickly controlled.

An object is to provide a novel hot house in which the humidity may be regulated, particularly during the late afternoon and night periods so as to reduce to a minimum likelihood of molding or spotting of the plants or flowers therein.

Another object is to provide a novel means which may be readily incorporated in conventional hot houses now in use whereby the temperature and humidity thereof may be easily and quickly regulated.

Another object is to provide a novel hot house whereby the heat required to heat the same may be reduced to a minimum.

A still further object is to provide novel means in hot houses whereby the control of moisture in the soil will be aided as well as permitting the economical use of fumigants.

A still further object is to provide novel means in hot houses whereby the same may be ventilated without ordinary resultant drafts during such ventilation.

A still further object is to provide novel means in hot houses whereby when carbon dioxide is used to aid in the growth of plants, the amount of such carbon dioxide liberated may be reduced to a minimum.

Other objects, advantages, and features of invention may appear from the accompanying drawing, the subjoined detail description and the appended claims.

The accompanying drawing illustrates one form of my invention in more or less diagrammatic or illustrative manner and in which:

Figure 1 is a perspective and substantially diagrammatical view of a hot house embodying my invention. A portion thereof is broken away to facilitate and aid in the illustration.

Fig. 2 is a transverse sectional view thereof taken on line 2—2, Fig. 1, showing a more or less diagrammatical sectional and end view thereof.

The green house or hot house A may be constructed in any suitable manner pertaining to hot house constructions which have transparent or translucent side walls 1 and roof 2 which may be of any suitable type such as the gable roof shown. Entrance doors 3 are provided in suitable places for entrance and egress to the house and preferably such doors are of the well-known double-door construction so that change of atmospheric and humidity conditions within the house will not be materially affected during ingress and egress.

The main feature of my invention resides in the provision of a transparent or translucent partition or ceiling 6 within the green house or hot house and which ceiling 6 is provided with a plurality of ventilators 7 of any suitable type and construction.

The ceiling 6 divides the hot house into an upper zone or compartment B and into a lower zone or compartment C. The ceiling 6 may be either of glass, Cellophane, celluloid or other suitable transparent or translucent material and may be horizontal across the hot house or of raised construction along its mid-length or mid-width and is preferably positioned therein at a suitable height sufficient to clear the plants which are being propagated therein.

The hot house proper is provided with a plurality of ventilators 12 in predetermined places along the roof, ends and side walls thereof and such ventilators may be of such construction as to be opened and closed by hand or by automatic controls.

The transparent ceiling 6 does not necessarily have to be air tight when the ventilators therein are closed, but such ceiling 6 should be sufficiently air tight to prevent passage of considerable quantities of air therethrough and is sufficiently air tight as distinguished from porous cloth.

I have found that by equipping green houses or hot houses with a transparent or translucent ventilated ceiling that atmospheric conditions such as moisture, temperature, and ventilation in plant propagation houses may be easily and satisfactorily controlled and the temperature therein may be lowered without materially changing the humidity in the growing chamber and compartment C; as well as the humidity may be lowered without materially changing the temperature in the growing chamber and compartment C.

To lower the humidity in the air of the lower compartment or growing chamber C the ventilators for the upper compartment are closed and then the ventilators in the ceiling are opened, thereby allowing dry air from the upper compartment to transfer and commingle with the air in the lower compartment and also permit the moist air in the lower compartment to pass into the upper compartment, thereby effecting a drying of the air in the lower compartment by the transfer of air from one compartment to the other. In the event sufficient dry air was not entrapped in the upper compartment when the ventilators thereto were closed to effectively dry the air in the lower compartment, the ventilators in the ceiling are then closed and the outside ventilators to the upper compartment are opened to permit additional dry air to enter the upper compartment after which the outside ventilators are again closed and after the air therein has been raised to the desired temperature the inside or ceiling ventilators are opened to permit additional transfer of air from one compartment to the other. The air in the upper compartment may be heated or not as desired.

The transparent ventilated ceiling also permits the lower compartment to be heated with a minimum consumption of fuel, because it will not be necessary to heat the space in the upper compartment which is used to entrap and hold desired quantities of dry air.

By the construction of green houses hereinbefore disclosed, I have also found that the temperature in the growing compartment C may be lowered without affecting the humidity therein and this may be accomplished by closing the ceiling ventilators in the upper compartment, thus permitting free circulation of air therethrough, which circulation of air will lower the temperature in the growing compartment. This construction also enables complete and free ventilation of the growing compartment without any drafts of air passing therethrough; and the transparent ceiling will, during the night time maintain the temperature of the growing compartment at a higher degree than the temperature in the upper compartment.

By providing a green house with a ventilated ceiling economy is obtained when carbon dioxide is used for aiding the growth of plants, in that a lesser amount thereof may be liberated to effectively accomplish its purpose, and lesser quantities of fumigants may be used when fumigating the plants in the growing chamber, because the ventilators in the ceiling may be closed, thereby reducing to a minimum the space in which such carbon dioxide or fumigants and the like are liberated.

By controlling the temperature and humidity in the growing chamber as above indicated, the control of mildew and other atmospheric diseases or insects on the growing plants in the lower compartment will be materially aided.

The growing chamber may have the usual hot and cold water pipes and heating apparatus common in the art.

If desired the translucent ceiling may be colored as desired with any suitable color to prevent sunburn and control the admission of light to the growing compartment.

In this application the term transparent or translucent has been used and should be considered interchangeable one with the other. That is to say, although there may be a technical distinction between transparent and translucent, nevertheless such distinction is not to be considered in this application and the use of one is to include and embrace the other.

I claim:

1. In combination with a green house, of a transparent or translucent partition extending from side to side and end to end of said green house and between the floor and roof thereof.

2. In a green house having side walls and a roof; a partition dividing said green house from end to end and side to side; said roof and partition being permeable to rays which are beneficial to plants within said green house.

3. In a green house having side walls and a roof; a partition dividing said green house from end to end and side to side; said roof and partition being permeable to rays which are beneficial to plants within said green house; and closures in said partition for controlling air transfer above and below said partition.

4. A green house comprising independently ventilatable upper and lower compartments; and a transparent partition dividing said compartments.

5. A green house comprising independently ventilatable upper and lower compartments and a transparent or translucent partition dividing said compartments; and means in said partition for controlling air transfer between said upper and lower compartments.

6. A green house having interposed therein a transparent or translucent ceiling extending substantially from side to side and end to end of said green house.

7. A green house having interposed therein a transparent or translucent ventilated ceiling, said ceiling extending substantially from side to side and end to end of said green house.

8. In combination with a green house, of a transparent or translucent partition extending substantially from side to side and end to end of said green house and between the floor and roof thereof, and closures in said partition for controlling air transfer above and below said partition.

9. In combination with a green house, having side walls and a roof of a transparent or translucent ceiling interposed between the floor and roof of said green house and extending substantially from end to end and side to side of said green house, said roof and ceiling being permeable to rays which are beneficial to plants within said green house; means in said ceiling for controlling air transfer above and below said ceiling; and other means for independently ventilating the space above and below said ceiling.

JOHN I. ATKINSON.